United States Patent [19]

Bauman et al.

[11] Patent Number: 5,625,892
[45] Date of Patent: Apr. 29, 1997

[54] DYNAMIC POWER REGULATOR FOR CONTROLLING MEMORY POWER CONSUMPTION

[76] Inventors: Mitchell A. Bauman, 48 Indian Hills Dr., Circle Pines, Minn. 55014; Michael L. Haupt, 3091 Evelyn St., Roseville, Minn. 55113

[21] Appl. No.: 363,446

[22] Filed: Dec. 22, 1994

[51] Int. Cl.$^6$ ................................................. H04B 7/005
[52] U.S. Cl. .......................... 455/69; 455/88; 455/343
[58] Field of Search .............................. 455/67.1, 69, 68, 455/343, 38.3, 67.6, 54.2, 229, 88, 54.1

[56] References Cited

U.S. PATENT DOCUMENTS 5,351,041   9/1994  Ikata et al. ............................ 455/343

Primary Examiner—Reinhard J. Eisenzopf
Assistant Examiner—Nguyen Vo
Attorney, Agent, or Firm—Charles A. Johnson; Mark T. Starr

[57] ABSTRACT

A dynamic power consumption reduction apparatus for reducing power consumption by temporarily delaying multiple data transfer interfaces. Data transfer interfaces are only delayed in rare circumstances where an exceptionally high number of data transfers are occurring for a period of time. The number of active data transfer interfaces is monitored, and a count value is incremented or decremented depending on the number of active data transfer interfaces. If the count value reaches a threshold value, it indicates that the number of data transfers for a predetermined period of time is exceptionally high, and therefore power consumption is high. Where the number of data transfers is high for a predetermined period of time, delays are injected into the handshake cycle to delay return of data acknowledge signals from data receivers to data transmitters. The delays are discontinued when the data transfer interface activity is reduced to a normal level. Hysteresis is provided to allow time for the power sourcing circuitry to recharge before discontinuing the delays.

17 Claims, 12 Drawing Sheets

| SC-A WRITE | SC-B WRITE | SC-C WRITE | SC-D WRITE | OR 276 OUTPUT (LINE 288) | INV SC-A WRITE | INV SC-B WRITE | INV SC-C WRITE | INV SC-D WRITE | OR 266 OUTPUT (LINE 286) |
|---|---|---|---|---|---|---|---|---|---|
| 0 | 0 | 0 | 0 | 1 | 1 | 1 | 1 | 1 | 0 |
| 0 | 0 | 0 | 1 | 1 | 1 | 1 | 1 | 0 | 0 |
| 0 | 0 | 1 | 0 | 1 | 1 | 1 | 0 | 1 | 0 |
| 0 | 0 | 1 | 1 | 1 | 1 | 1 | 0 | 0 | 0 |
| 0 | 1 | 0 | 0 | 0 | 1 | 0 | 1 | 1 | 0 |
| 0 | 1 | 0 | 1 | 1 | 1 | 0 | 1 | 0 | 0 |
| 0 | 1 | 1 | 0 | 0 | 1 | 0 | 0 | 1 | 0 |
| 0 | 1 | 1 | 1 | 0 | 1 | 0 | 0 | 0 | 1 |
| 1 | 0 | 0 | 0 | 0 | 0 | 1 | 1 | 1 | 0 |
| 1 | 0 | 0 | 1 | 1 | 0 | 1 | 1 | 0 | 0 |
| 1 | 0 | 1 | 0 | 0 | 0 | 1 | 0 | 1 | 0 |
| 1 | 0 | 1 | 1 | 0 | 0 | 1 | 0 | 0 | 1 |
| 1 | 1 | 0 | 0 | 0 | 0 | 0 | 1 | 1 | 0 |
| 1 | 1 | 0 | 1 | 0 | 0 | 0 | 1 | 0 | 1 |
| 1 | 1 | 1 | 0 | 0 | 0 | 0 | 0 | 1 | 1 |
| 1 | 1 | 1 | 1 | 0 | 0 | 0 | 0 | 0 | 1 |

FIG. 9

DYNAMIC POWER REGULATOR FOR CONTROLLING MEMORY POWER CONSUMPTION

BACKGROUND OF THE INVENTION

1. Field of the Invention

This invention relates to the reduction of power consumption in high frequency data processing systems, and more particularly to the reduction of peak power demands by injecting delays when a predetermined number of data transfer paths indicate long periods of high-speed, high-volume switching activity.

2. Description of the Prior Art

Data processing systems, especially multi-processing systems, often allow simultaneous data transfers to be made to multiple components. These data transfers can be to cache memories, main storage memories, or even to peripheral devices. Multiple data transfers, coupled with high data switching frequencies, can result in high system power consumption. The power consumed by the system is directly related to the switching frequency. The switching frequency is affected by the system clock frequency, and by the binary data values to be clocked relative to the previous value. High system clock frequency is desirable for the obvious reason of increasing the operation speed of the data processing system. The power consumption due to the system clock frequency is predictable, but the power consumption due to toggling of the binary data values depends on the rate at which the binary data values actually change logic states. For instance, a single data value switching from time t=0 to a later time t=T having the following data pattern

```
0   1   0   1   0   1   0   1
(t=0)                    (t=T)
``` will consume more power than where the data pattern is

```
0   0   0   0   1   1   1   1
(t=0)                    (t=T)
``` due to the higher rate of logic state switching. Where multiple data transfers are simultaneously occurring, and each data transfer consists of multiple bytes, the power consumption can be great.

Under normal circumstances, however, it is unlikely that all data transfer interfaces will be simultaneously active, and that each data transfer will have data patterns consisting of continuously alternating logic states. Therefore, under normal operating conditions, the power consumption can be estimated by an "average worst case" analysis. However, for system test purposes, Diagnostic Verification Routines (DVRs) are written to continuously alternate the logic states of the data, in order to fully test the data transfer circuitry and receiving circuitry. Furthermore, it is theoretically possible that such data patterns could occur during real-time operation of the system.

In order to provide sufficient power capability, the power supplies must provide voltage and current adequate to meet this absolute worst-case situation. This results in larger, more expensive power supplies than those that would be necessary for the average worst-case situation. Since the absolute worst-case situation would occur only in exceptional circumstances, it would be a waste of resources to implement large, expensive power supplies to handle this rare event. The present invention solves this problem, and allows for utilization of smaller, less expensive power supplies which are capable of providing adequate power in the "average worst-case" situation.

The present invention uses inexpensive circuitry to determine when a predetermined threshold of data transfer activity is reached. When this threshold is reached, temporary delays are injected into the data transfer handshake loop to temporarily reduce the data transfer rates, which in turn will reduce the power consumption during this time period. Expensive, large-capacity power supplies are therefore not necessary, and the added cost of the additional circuitry is trivial compared to the cost of the larger power supplies. Furthermore, the size of the power supplies is typically proportional to the amount of power capability, and therefore valuable space is saved. The circuitry comprising the invention requires little real estate, and can actually be implemented in an existing gate array which would result in a 0% increase in real estate use. The reduction in power consumption and the temporary reduction in data transfer rates can also ease cooling requirements, and only "average" worst-case cooling capabilities would need to be implemented. The savings of space and cost of power and cooling requirements far outweighs the slight reduction in data transfer rates, particularly in light of the fact that this reduction in data transfer rates will very seldom need to be actuated.

Designs have been constructed to deal with the problem of peak power consumption. One such design is described in U.S. Pat. No. 5,201,071 by Webb, issued on Apr. 6, 1993. The Webb reference appears to disclose a method of reducing peak voltages of an RF transmitter by shifting the tones of a second sideband from those in a first sideband. Webb discloses a delay circuit that may be used to create such a phase shift (column 4, lines 37–49). However, the delay method used to generate a phase shift in Webb is not used in the present invention. In the present invention, the delay circuitry delays the acknowledge signal in a handshaking arrangement to temporarily reduce the rate of data transfers. Furthermore, the delay in the Webb reference is always activated, where the delay circuitry in the present invention is only activated when necessary.

The "Dynamic Power Regulator For Controlling Memory Power Consumption" thus provides a way to reduce system costs and system space requirements, while still resolving absolute worst-case scenarios. The additional cost and space requirements of the present invention is little to none, and the time delay penalty for injecting delays will be virtually nonexistent (and most likely completely nonexistent) over time.

OBJECTS

It is a primary object of the present invention to provide a data transmission system that requires less peak power consumption.

It is another object of the invention to reduce the cost and space required of a data processing system's power sourcing circuitry and system cooling apparatus.

It is yet another object to provide a dynamic power regulation circuit to reduce the power consumption of the data processing system during periods of high data-interface activity.

Still another object is to activate the dynamic power regulation circuit only at times of potential periods of excessively high power consumption.

It is still another object of the present invention to ensure that data transmission rates will not be affected during periods of normal power consumption.

It is another object of the invention to reduce the power consumption by temporarily delaying the rate of multiple data transmissions.

It is still another object of the invention to delay the rate of multiple data transmissions by injecting delays into the handshake cycles by suspending subsequent data transmissions until their associated handshake cycles have completed.

Other more detailed objectives will become apparent from a consideration of the Drawings and the Detailed Description of the Preferred Embodiment.

SUMMARY OF THE INVENTION

The Dynamic Power Regulator For Controlling Memory Power Consumption provides for the use of less expensive, smaller power supplies in a data processing system having multiple data transfer interfaces. Rather than requiring power sourcing capabilities to handle absolute worst-case power requirements, the present invention allows power supplies to be used that have the power capacity to handle only average worst-case power requirements. In only rare situations of extremely high data transmission activity are the power supplies driven to a point beyond their average worst-case power capability. It is uneconomical from the standpoint of size and cost to implement power supplies to handle these rare situations. The present invention allows smaller, less expensive power supplies to handle these situations by temporarily delaying the data transfer interfaces, which reduces peak power consumption, yet causes overall data transmission rate degradation to be virtually undetectable.

The present invention determines the number of active data transfer interfaces by monitoring the number of write requests issued by multiple data transmitters. The active write requests are sent to data receivers at the same time that the data from the data transmitters is sent to the data receivers. Under normal conditions, the data receivers will complete the handshake by sending a data acknowledge signal to the data transmitters upon receipt of the data. When a predetermined number of the data transfer interfaces are active, it is assumed that the power capability of the power supplies may be exceeded. When this occurs, the data transfer interfaces are delayed by temporarily injecting delays into the handshake cycle by delaying return of the data acknowledge signals. A data transmitter will not issue another write request until it has received a data acknowledge for its previous write request. These temporary delays of the handshake cycles reduce the power demand so that the power supplies and the power supply output capacitance can adequately provide power.

In order to accomplish the handshake cycle delays, the invention first determines the total number of active write requests. This number is then decoded to generate an increment signal or a decrement signal which in turn is sent to a counter. The increment signal is generated when the total number of active write requests is greater than a predetermined value, and the decrement signal is generated when the total number of active write requests is less than the predetermined value. Neither an increment or decrement signal is generated when the total number of active write requests is equal to the predetermined value. The counter receives the increment or decrement signal, and respectively increments or decrements a count value. When the count value reaches a threshold value, the return of the data acknowledge signal to the associated data transmitter will be delayed. The signal returned to the data transmitter will be a delayed data acknowledge signal. The threshold value represents an approximate maximum time that the power supplies can adequately supply power during periods of very high data transfer activity.

Hysteresis logic is also provided to cause the system to continue to return the delayed data acknowledge signals for a predetermined duration rather than returning the data acknowledge signal normally returned. This hysteresis logic is provided to prevent alternating selections of the data acknowledge and delayed data acknowledge signals when the count value is near the threshold value. The hysteresis logic requires that the count value decrement to a point much less than the threshold value before the data acknowledge signals, rather than the delayed data acknowledge signals, can again be returned to the data transmitters. This gives the power supply time to recharge its output capacitors, and keeps the power supply from operating at its peak capacity for any extended period of time.

Error protection is also accorded through the use of a "zero detect" circuit. This circuit continually monitors the count value, and prevents generation of the decrement signal to the counter when the count value is equal to zero. This is necessary because decrementing the binary count value when it is equal to zero will actually cause the count value to "roll over" to the highest count value. This will falsely trigger selection of the delayed data acknowledge signals at a time when data transfer rates are actually very low. The zero detect circuit prevents this problem by blocking the decrement signal to the counter when the count value is equal to zero.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

BRIEF DESCRIPTION OF THE DRAWINGS

FIG. 9 is a truth table showing the Count Decoder's response to all possible combinations of active and inactive data transfer interfaces from the storage controllers;

DETAILED DESCRIPTION OF THE PREFERRED EMBODIMENT

Figure 1:
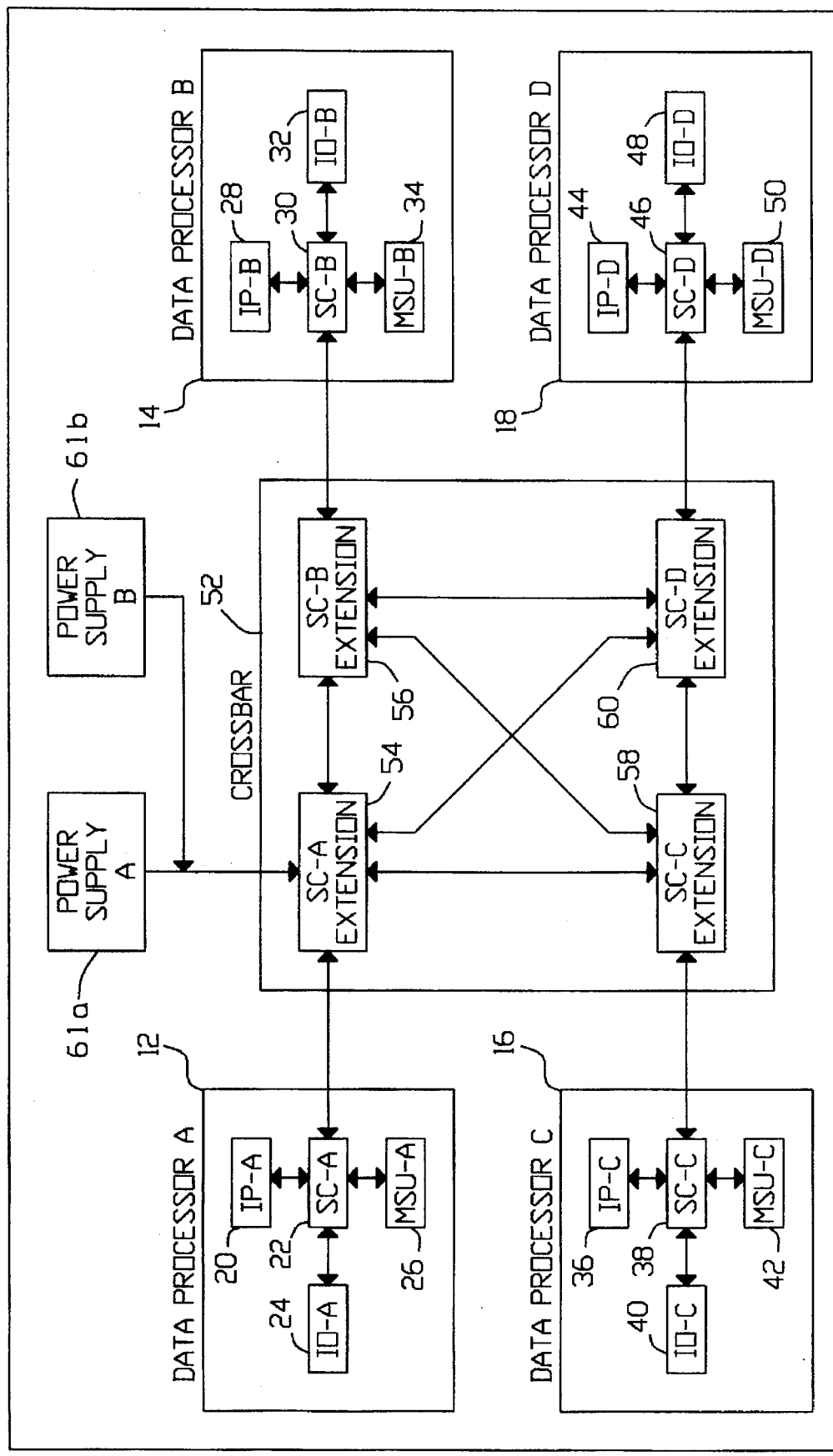
FIG. 1 is a block diagram of the Data Processing System in which the present invention resides.

FIG. 1 is a block diagram of the Data Processing System 10 in which the present invention resides. There are up to four physical data processing components, labeled Data Processor A 12, Data Processor B 14, Data Processor C 16, and Data Processor D 18. Each data processor includes one or more instruction processors (IP), a storage controller (SC), input/output capabilities (IO), and a main storage unit (MSU). The IPs are the central processing units for the execution of program and system software instructions. The SCs provide storage request priority and data routing between the major components of the system. Input/output capabilities are provided by the IOs, and the MSUs provide the main storage capability for each data processing component. Data Processor A 12 includes IP-A 20, SC-A 22, IO-A 24, and MSU-A 26. Similarly, Data Processor B 14 includes IP-B 28, SC-B 30, IO-B 32, and MSU-B 34; Data Processor C 16 includes IP-C 36, SC-C 38, IO-C 40, and MSU-C 42; and Data Processor D 18 includes IP-D 44, SC-D 46, IO-D 48, and MSU-D 50.

The Data Processing System 10 in which the invention resides also includes circuitry to connect the SCs from one Data Processor to the SCs in another. This circuitry is referred to as the Crossbar 52 circuitry. The Crossbar 52 allows data to be transferred from one SC to another SC. The Crossbar 52 comprises an SC-A Extension 54, SC-B Extension 56, SC-C Extension 58, and SC-D Extension 60. The SC-A Extension 54 allows SC-A 22 to transfer data to, or receive data from, SC-B 30, SC-C 38, and SC-D 46. The SC-B Extension 56, SC-C Extension 58, and SC-D Extension 60 similarly allow data transfers between SCs. Therefore, the Crossbar 52 allows a Storage Controller (SC) within one Data Processor component to access memory in another Data Processor component. The Crossbar 52 receives power from a power source 61.

In the Data Processing System 10 of FIG. 1, the Crossbar 52 can simultaneously manage data transfers between multiple Data Processors. For example, the Crossbar 52 could receive data from SC-A 22, and could simultaneously receive data from SC-B 30, SC-C 38, and SC-D 46. With all SC/Crossbar interfaces simultaneously active, the power consumption could exceed the power capability of the power supplies where the clock frequency is very high and the data values are consistently toggling between a low logic and a high logic level. It would be rare for all interfaces to be active at a time when each interface was constantly switching logic states, but this condition is possible, especially during system test, where such data patterns are purposely transmitted across the interfaces. Rather than requiring larger, more expensive power supplies to meet this infrequent condition, the present invention injects data transfer delays during those times of excessively high power consumption, which reduces the maximum power output which is required of the power supplies. It should be recognized that the present invention is not limited to the structure depicted in FIG. 1, but rather can be used in any system having multiple data transfer interfaces.

Figure 2:
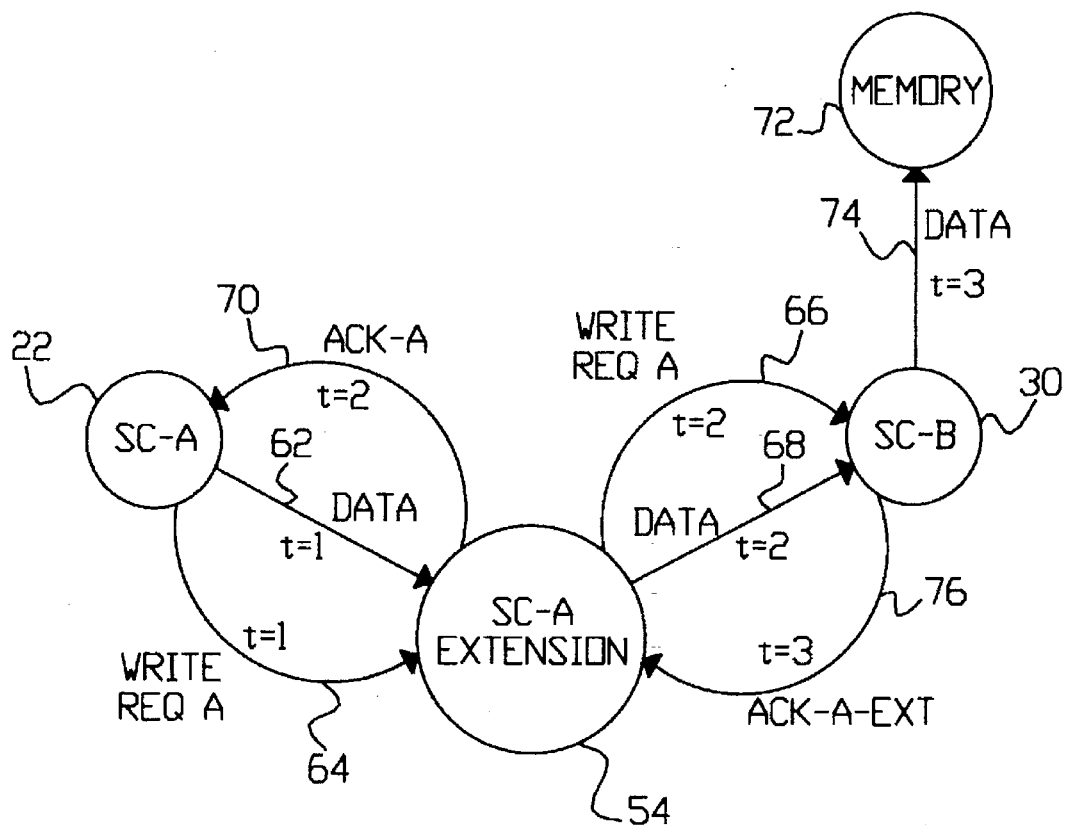
FIG. 2 is a state flow diagram of the write requests and acknowledges which occur during a memory request from SC-A to SC-B.

FIG. 2 is a state flow diagram of the write requests and acknowledges which occur during a memory request from SC-A 22 to SC-B 30. Although only SC-A 22 and SC-B 30 are shown in the diagram, the ensuing discussion applies equally to transfers of data between any two storage controllers.

At time t=1, SC-A 22 sends DATA on Line 62 and a WRITE REQ A signal on Line 64 to the SC-A Extension 54 in the Crossbar 52. This indicates that SC-A 22 wants to write data to another storage controller, so that the recipient storage controller can in turn write data to its associated memory. Once the SC-A Extension 54 has received the WRITE REQ A signal and the DATA, it sends the WRITE REQ A signal and the DATA to SC-B 30 as shown on Lines 66 and 68 respectively. This occurs at time t=2. Also at time t=2, an ACK-A signal (Acknowledge to SC-A signal) is sent back to SC-A 22 on Line 70 to indicate to SC-A 22 that the SC-A Extension 54 has received and forwarded the data. At time t=3, SC-B 30 writes the DATA to its Memory 72 across Line 74, where the Memory 72 can be the SC-B's cache memory or its associated Main Storage Unit (MSU). Also at time t=3, SC-B 30 sends an ACK-A-EXT (Acknowledge to SC-A Extension) signal on Line 76 back to the SC-A Extension 54 in the Crossbar 52 to notify the SC-A Extension that the DATA has been forwarded to the Memory 72.

Figure 3:
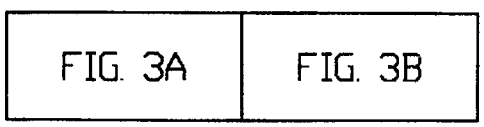
FIG. 3 includes FIG. 3A and FIG. 3B positioned as shown, and illustrates a composite block diagram of the preferred embodiment of the present invention.
Figure 3A:
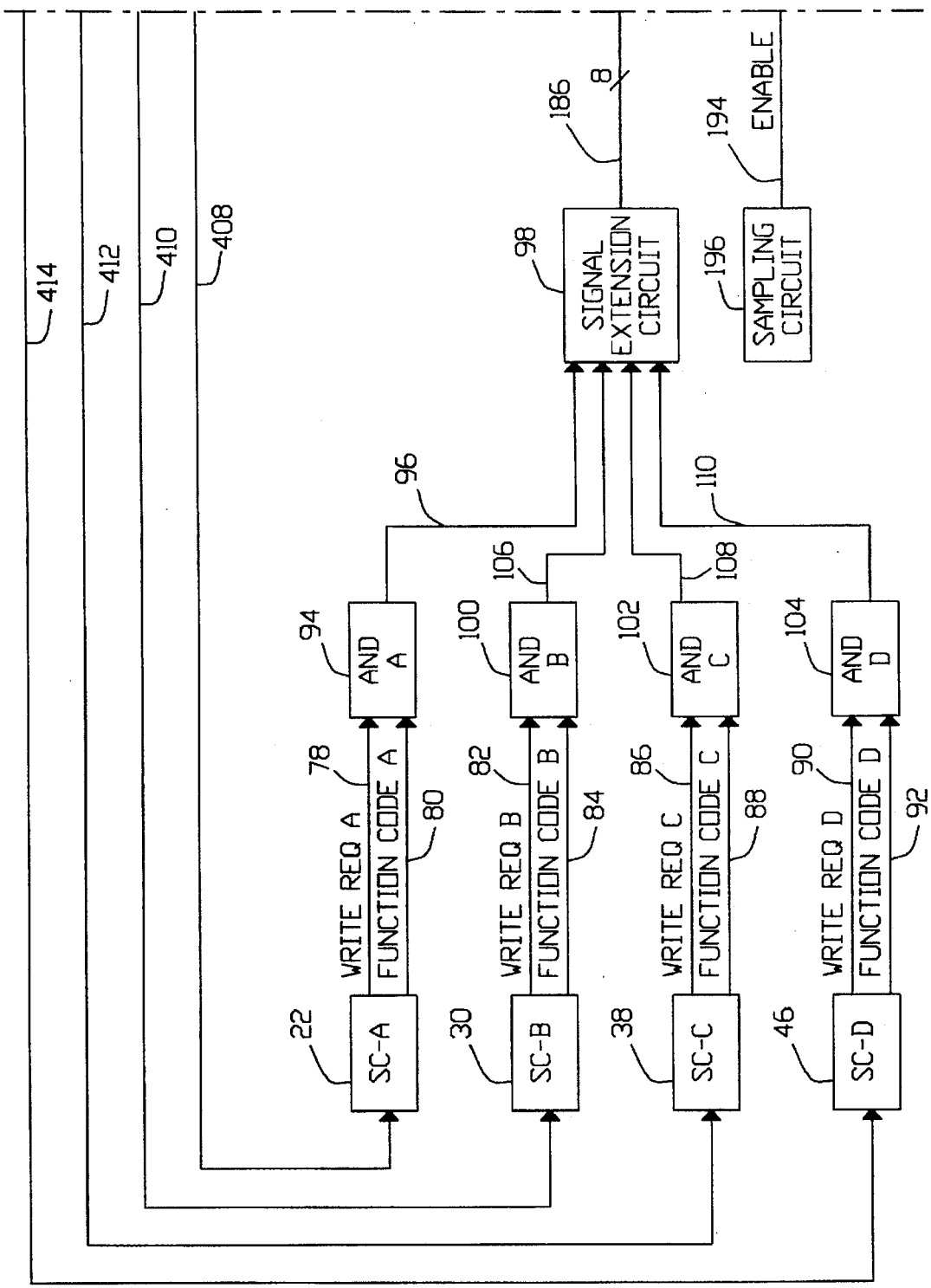
Figure 3B:
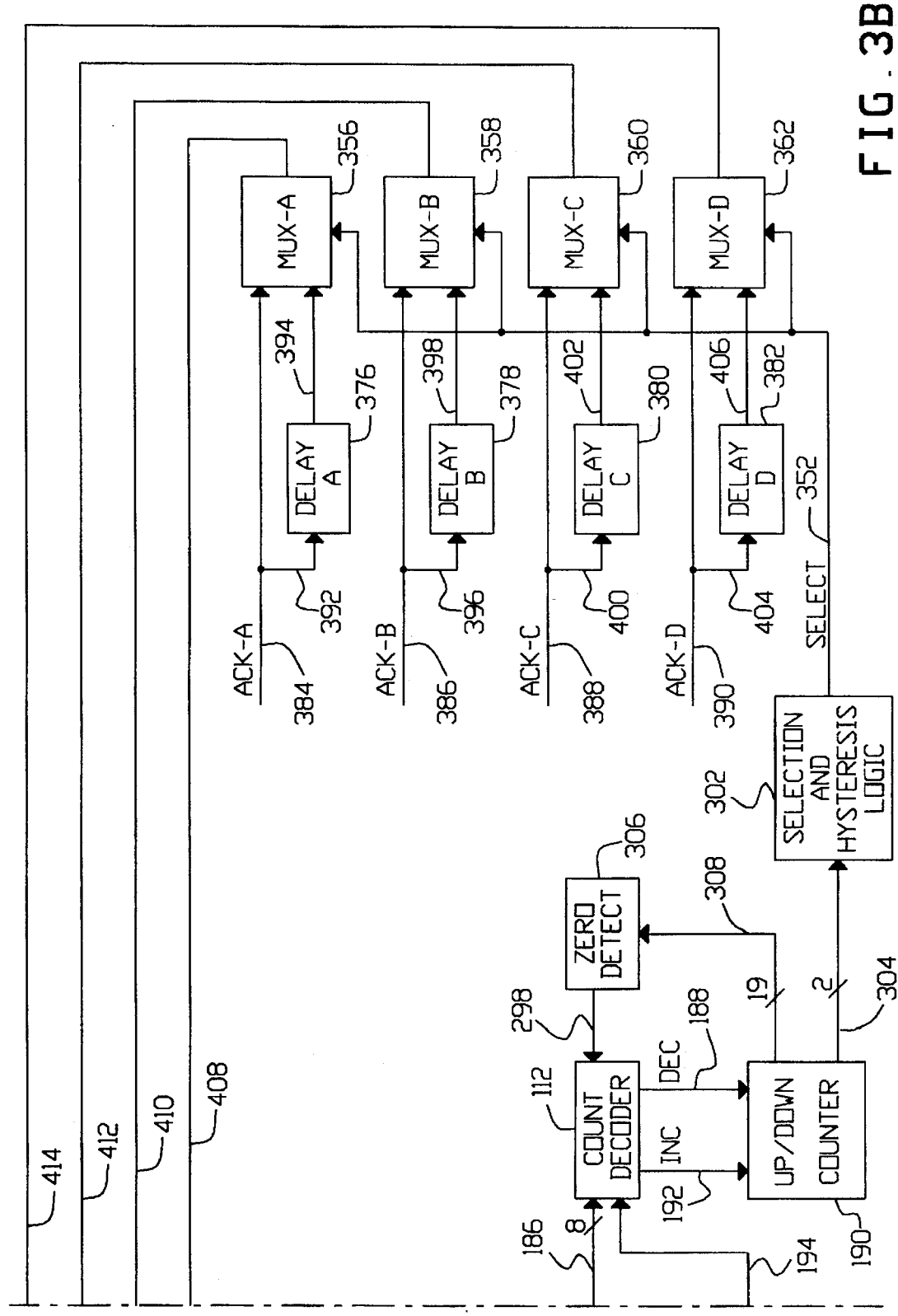

FIG. 3 includes FIG. 3A and FIG. 3B positioned as shown, and illustrates a composite block diagram of the preferred embodiment of the present invention. Storage controllers SC-A 22, SC-B 30, SC-C 38, and SC-D 46 from FIG. 1 are shown in FIG. 3. Each of the storage controllers will output, among other signals, a write request signal and a function code. SC-A 22 outputs WRITE REQ A on Line 78 and FUNCTION CODE A on Line 80, SC-B 30 outputs WRITE REQ B on Line 82 and FUNCTION CODE B on Line 84, SC-C 38 outputs WRITE REQ C on Line 86 and FUNCTION CODE C on Line 88, and SC-D 46 outputs WRITE REQ D on Line 90 and FUNCTION CODE D on Line 92. The write request signals indicate that the storage controller wants to write data to another storage controller. The function codes indicate the type of data write that is to be performed. In the preferred embodiment of the invention, only storage controllers executing eight-word data write functions will be considered. Whether only eight-word data write functions or all write functions are required to activate the invention's delay mechanism depends on the power capability of the power supplies used. The power capabilities in the present invention's system were such that single write functions did not cause the power supplies to exceed their limits. Therefore, in the preferred embodiment, only eight-word write functions are considered. This is accomplished by requiring the presence of both a write request, and a function code indicating an eight-word write. AND A 94 therefore ensures that both the WRITE REQ A signal on Line 78 and the eight-word FUNCTION CODE A on Line 80 are present, and if so, sends an SC-A WRITE INDICATION signal on Line 96 to the Signal Extension Circuit 98. In a similar manner, AND B 100, AND C 102 and AND D 104 will send an SC-B WRITE INDICATION signal, an SC-C WRITE INDICATION signal, and an SC-D WRITE INDICATION signal on Lines 106, 108, and 110 respectively when their respective write request and function code signals are active. As few as zero and as many as four eight-word write requests may be active at any given time.

The Signal Extension Circuit 98 receives all of the WRITE INDICATION signals, and each WRITE INDICATION signal is extended out for four clock cycles. In the preferred embodiment, the system clock signal is divided into four clock "phases", so that each phase occurs once during each clock "cycle". The WRITE INDICATION signals are extended out for four clock cycles because the WRITE REQ A signal, WRITE REQ B signal, WRITE REQ C signal, and WRITE REQ D signal can be issued on different clock cycles. However, the eight-word data write resulting from a write request continues for four clock cycles. By extending each of the resulting WRITE INDICATION signals on Lines 96, 106, 108 and 110 to be present for four clock cycles, the Count Decoder 112 is able to determine the number of active write data transfers at any given time. This will become more apparent in the ensuing discussions of FIGS. 4, 5, and 8.

Figure 4:
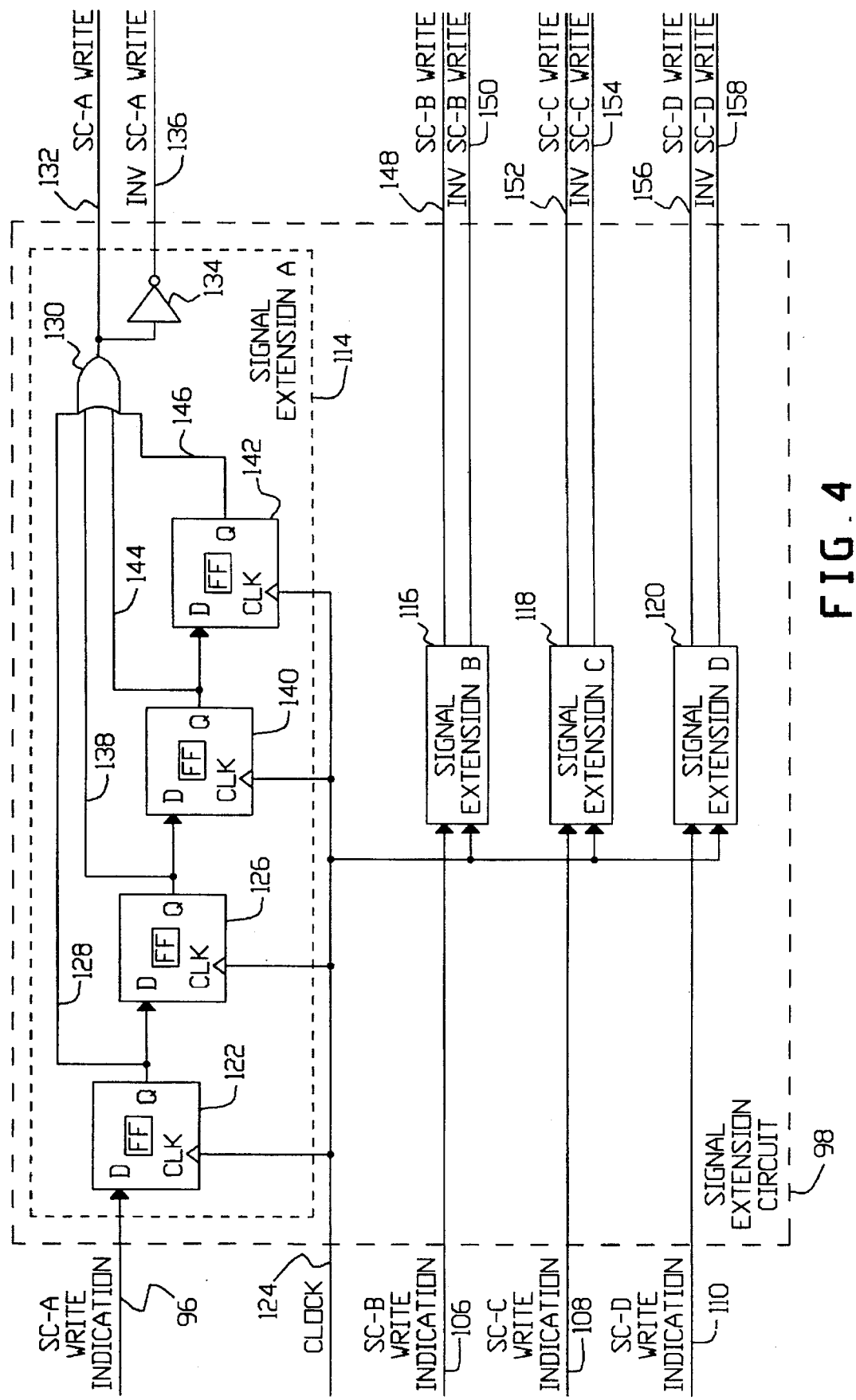
FIG. 4 is a block diagram of the Signal Extension Circuit.

FIG. 4 is a block diagram of the Signal Extension Circuit 98. The SC-A WRITE INDICATION signal on Line 96 is input into Signal Extension A 114, the SC-B WRITE INDICATION signal on Line 106 is input into Signal Extension B 116, the SC-C WRITE INDICATION signal on Line 108 is input into Signal Extension C 118, and the SC-D WRITE INDICATION signal on Line 110 is input into Signal Extension D 120. Signal Extension A 114, Signal Extension B 116, Signal Extension C 118, and Signal Extension D 120 all have identical circuitry, so only the detailed circuitry of Signal Extension A 114 will be shown.

In Signal Extension A 114, the SC-A WRITE INDICATION signal on Line 96 is input to a first flip-flop, labeled FF 122. A common clock signal, labeled CLOCK on Line 124, clocks this signal into FF 122. This resulting signal from the Q output of FF 122 is sent to FF 126, and is also sent via Line 128 to the OR-gate labeled OR 130. Therefore, as soon as the CLOCK signal pulses, OR 130 will output a high signal on Line 132, labeled SC-A WRITE, and the inverter, INV 134, will output a low signal on Line 136, labeled INV SC-A WRITE. Even though the SC-A WRITE INDICATION signal may have become inactive, the signal is extended by FF 126, which clocks in the Q output of FF 122 at the next clock pulse. The signal from the Q output of FF 126 is also sent to OR 130 via Line 138. Similarly, on the next two clock pulses, FF 140 and FF 142 will send signals to OR 130 via Lines 144 and 146 respectively. By latching the initial signal, shifting it through the flip-flops, and logically adding the results, the initial SC-A WRITE INDICATION signal on Line 96 is extended to four clock periods. This time is equal to the time that it takes to write its associated eight-word write data to the recipient storage controller's memory, and indicates the total time that the data transfer interface is active.

The output signals from Signal Extension B 116, Signal Extension C 118, and Signal Extension D 120 are generated the same way that the SC-A WRITE signal and the INV SC-A WRITE signal on Lines 132 and 136 were generated by Signal Extension A 114. Signal Extension B 116 generates the SC-B WRITE signal on Line 148, and the INVSC-B WRITE signal on Line 150. Signal Extension C 118 generates the SC-C WRITE signal on Line 152, and the INV SC-C WRITE signal on Line 154. Signal Extension D 120 generates the SC-D WRITE signal on Line 156, and the INV SC-D WRITE signal on Line 158.

Figure 5:
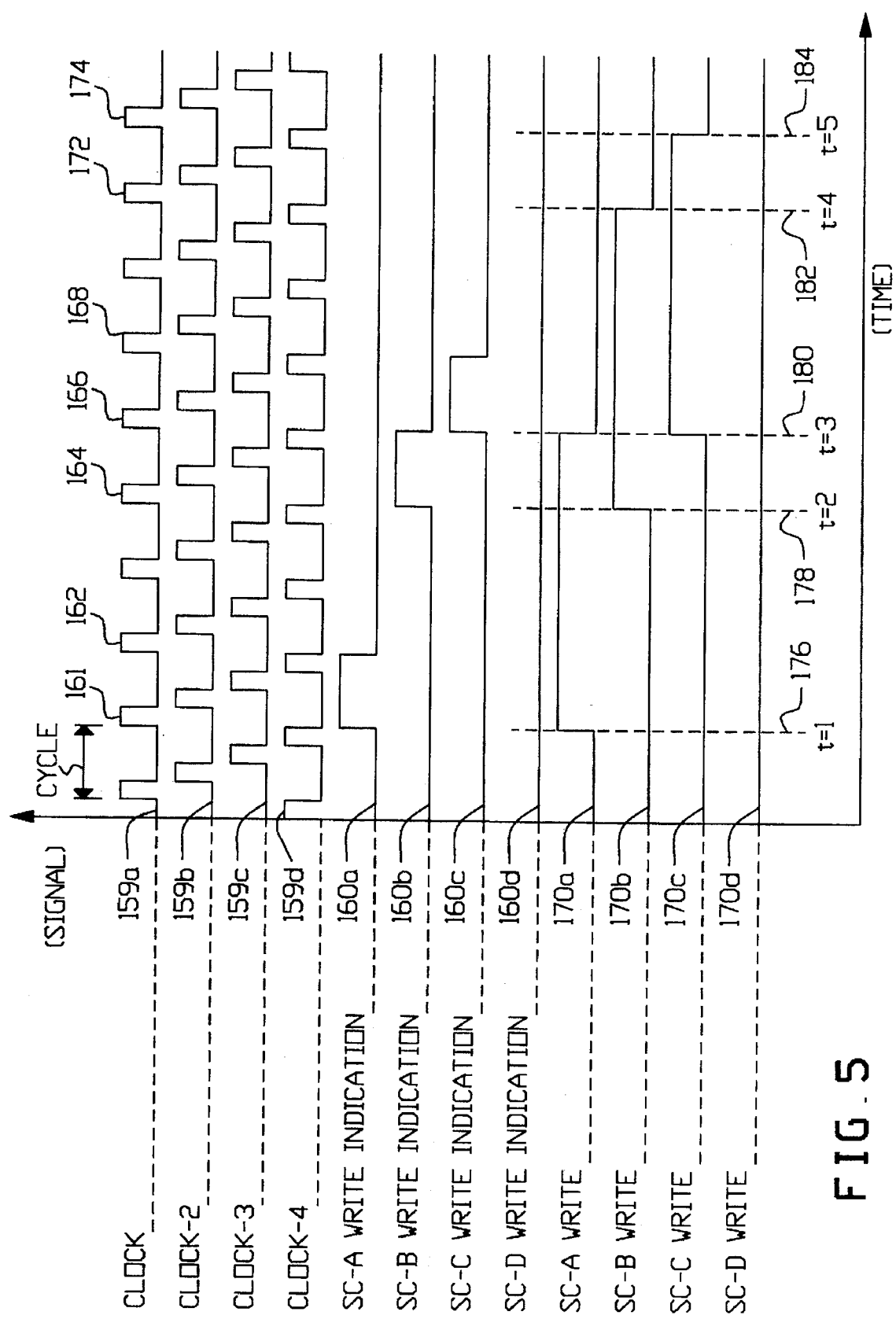
FIG. 5 is a waveform diagram showing the four-period extension accomplished by the Signal Extension Circuit.

FIG. 5 is a waveform diagram showing the four-period extension accomplished by the Signal Extension Circuit 98. The CLOCK signal is the clock signal represented on Line 124 of FIG. 4. In the preferred embodiment, the CLOCK signal shown as signal 159a in FIG. 5, is the first phase of the four phases which comprise a clock cycle. The other three phases are shown in FIG. 5 as CLOCK-2 159b, CLOCK-3 159c, and CLOCK-4 159d. The SC-A WRITE INDICATION, SC-B WRITE INDICATION, SC-C WRITE INDICATION, and SC-D WRITE INDICATION are shown in FIG. 5, and correspond to the signals on Lines 96, 106, 108 and 110 in FIGS. 3 and 4.

The WRITE INDICATION signals can occur on different cycles of the four-phase clock, as shown in FIG. 5. For example, the SC-A WRITE INDICATION signal in FIG. 5 is shown to become active on the rising edge of Pulse 160 of the CLOCK signal, and is inactivated on the rising edge of Pulse 162 of the CLOCK signal. The SC-B WRITE INDICATION signal is shown to become active on the rising edge of Pulse 164 of the CLOCK signal, and becomes inactive on the rising edge of Pulse 166 of the CLOCK signal. The SC-C WRITE INDICATION signal is shown to be activated on the rising edge of Pulse 166 of the CLOCK signal, and is inactivated on the rising edge of Pulse 168 of the CLOCK signal. In this example, the SC-D WRITE INDICATION signal is not activated. Since the eight-word data transfers associated with a write request occur over a four-cycle period (in the preferred embodiment, two words of data are transferred in parallel during each clock cycle), the WRITE INDICATION signals are extended over four clock cycles to correspond to the time that data is being transferred. As shown in FIG. 4, the CLOCK signal triggers the Signal Extension circuits (114, 116, 118 and 120), so the four-cycle extension begins on rising edges of the CLOCK signal. When the SC-A WRITE INDICATION signal becomes active on the rising edge of Pulse 160, the SC-A WRITE signal is activated until the occurrence of the rising edge of Pulse 166 as shown on line 170a in FIG. 5. Similarly, the SC-B WRITE signal is activated for four cycles, beginning on the rising edge of Pulse 164, and ending on the rising edge of Pulse 172 as shown on line 170b. The SC-C WRITE signal is active from the rising edge of Pulse 166 to the rising edge of Pulse 174 as shown on line 170c. Since the SC-D WRITE INDICATION signal was not activated in this example, the SC-D WRITE signal also remains inactive as shown on line 170d. It can then be seen by the waveform diagram which storage controller data transfers are occurring. At time t=1 on Line 176 until time t=2 on Line 178, one data transfer is occurring—namely, the SC-A WRITE signal. From time t=2 on Line 178 until time t=3 on Line 180, two data transfers are occurring (SC-A WRITE and SC-B WRITE). The SC-B WRITE and SC-C WRITE data transfers are occurring between time t=3 on Line 180 and time t=4 on Line 182. Only the SC-C WRITE signal is active between time t=4 on Line 182 and time t=5 on Line 184, and no data transfers are occurring after time t=5. It should be noted that the INV SC-A WRITE, INV SC-B WRITE, INV SC-C WRITE, and INVSC-D WRITE signals are also generated (as shown in FIG. 4), but are not shown in FIG. 5 for clarity.

Returning to FIG. 3, the Signal Extension Circuit 98 then transfers the SC-A WRITE, SC-B WRITE, SC-C WRITE, SC-D WRITE, INV SC-A WRITE, INV SC-B WRITE, INV SC-C WRITE, and INV SC-D WRITE signals (hereinafter collectively referred to as the SC WRITE signals) across Bus 186 to the Count Decoder 112. The Count Decoder 112 determines whether zero, one, two, three, or all four data transfers are occurring at a given time. When zero or one data transfer is occurring, the Count Decoder 112 will activate the DEC signal on Line 188. The DEC signal is a signal to the Up/Down Counter 190 indicating that the Up/Down Counter 190 should decrement its count value. When three or four data transfers are occurring, the Count Decoder 112 will activate the INC signal on Line 192, where the INC signal indicates to the Up/Down Counter 190 to increment its count value. When exactly two data transfers are occurring, the Count Decoder 112 will send neither an INC signal or a DEC signal, which will cause the count value in the Up/Down Counter 190 to remain the same. The operation and purpose of the Up/Down Counter 190 and its associated count value will be discussed in further detail in a later portion of this detailed description of the preferred embodiment.

The ENABLE signal on Line 194 is also an input to the Count Decoder 112 circuit. The ENABLE signal is generated by the Sampling Circuit 196, and provides a method of checking the number of active data transfers periodically, rather than on each clock cycle. Since data transfers occur over a four-cycle period in the preferred embodiment of the invention, it was determined that a counter increment or decrement from the Count Decoder 112 need only be generated every four clock cycles. The Sampling Circuit 196 allows this function to be performed.

Figure 6:
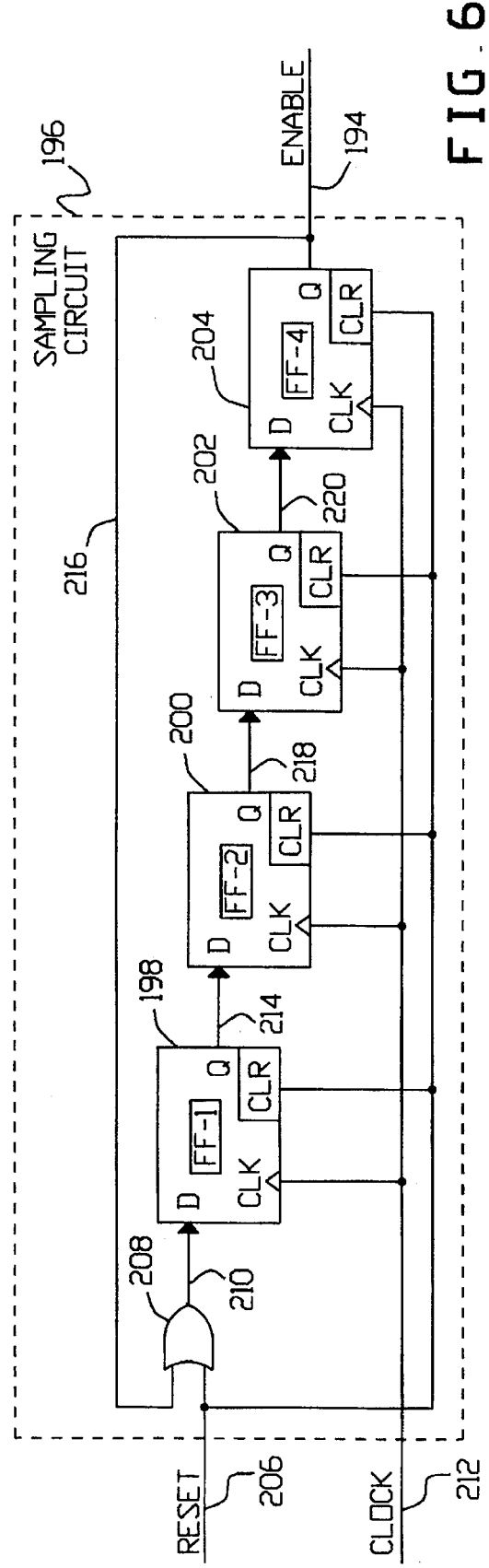
FIG. 6 is a schematic diagram of the Sampling Circuit of the preferred embodiment.

FIG. 6 is a schematic diagram of the Sampling Circuit 196 of the preferred embodiment. Since the ENABLE signal on Line 194 is only required every four clock cycles in this embodiment, four flip-flops are needed, which are labeled FF-1 198, FF-2 200, FF-3 202 and FF-4 204. Each flip-flop includes a data input labeled D, a clock input labeled CLK, a reset/clear input labeled CLR, and a data output labeled Q. The RESET signal on Line 206 is initially set to a high logic level to cause the output of OR 208 to go to a high logic level, which is sent to the D input of FF-1 198 via Line 210. The RESET signal on Line 206 also clears all flip-flop outputs to a low logic level by activating the CLR inputs. On the next occurrence of the CLOCK signal on Line 212, FF-1 198 will clock the signal at its D input to Line 214. The RESET signal on Line 206 is then inactivated, but the signal will continue to be propagated through the flip-flop chain on each successive pulse of the CLOCK signal on Line 212. When the Q output of FF-4 204 outputs the propagated signal, it is fed back on Line 216 to FF-1 198 to restart the process. The output of FF-4 204 is also used as the ENABLE signal on Line 194, which is sent to the Count Decoder 112 circuit. This results in the ENABLE signal being activated every four cycles of the CLOCK signal. The frequency in which the ENABLE signal is activated could be increased or decreased by respectively adding or removing flip-flops.

Figure 7:
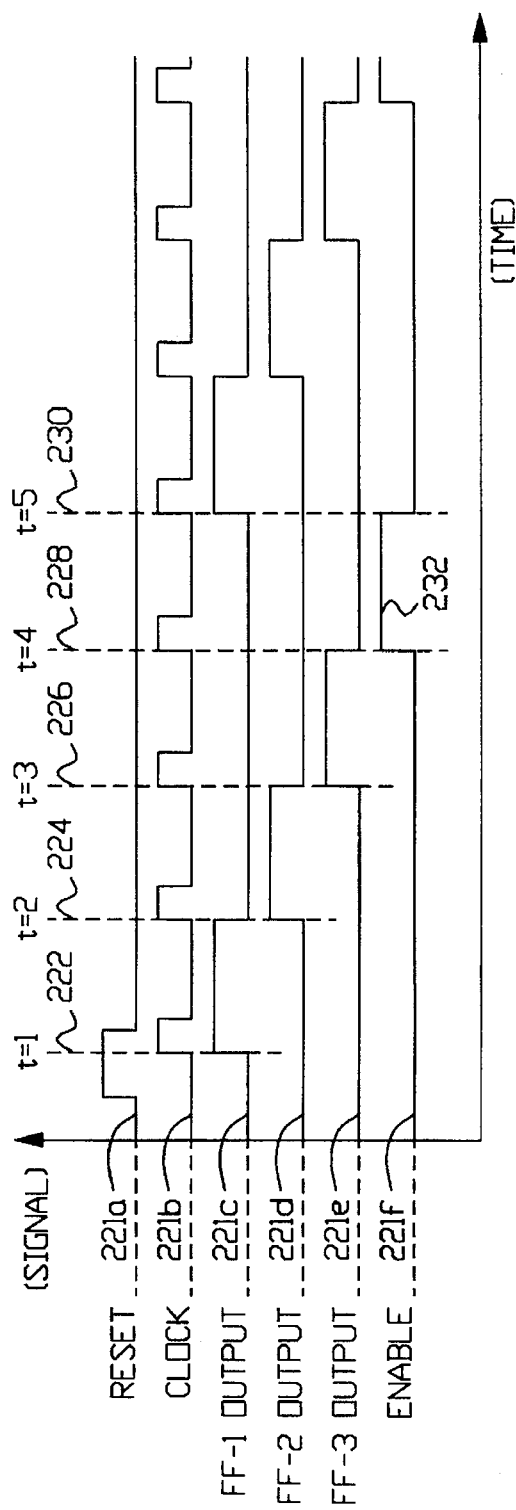
FIG. 7 is a waveform diagram showing the operation of the Sampling Circuit.

FIG. 7 is a waveform diagram showing the operation of the Sampling Circuit 196. The RESET signal, shown as signal 221a in FIG. 5, represents the signal on Line 206 of FIG. 6, and the CLOCK signal, shown as signal 221b, represents the signal on Line 212 of FIG. 6. Referring to both FIG. 6 and 7, the FF-1 OUTPUT signal represents the signal on Line 214, the FF-2 OUTPUT signal 221d represents the signal on Line 218, and the FF-3 OUTPUT signal 221e represents the signal on Line 220. The ENABLE signal 221f of FIG. 7 is shown in FIG. 6 on Line 194.

At time t=1 on Line 222, the CLOCK causes the RESET signal to be latched as the FF-1 OUTPUT. This signal is propagated to the FF-2 OUTPUT at the next rising edge of the CLOCK pulse, at time t=2 on Line 224. Similarly, the FF-3 OUTPUT and the ENABLE are activated at time t=3 on Line 226 and t=4 on Line 228 respectively. At time t=5 on Line 230, the FF-1 OUTPUT is again activated due to the feedback path on Line 216 of FIG. 6. As can be seen, the ENABLE signal, represented by Pulse 232, is activated every fourth cycle of the CLOCK signal.

Figure 8:
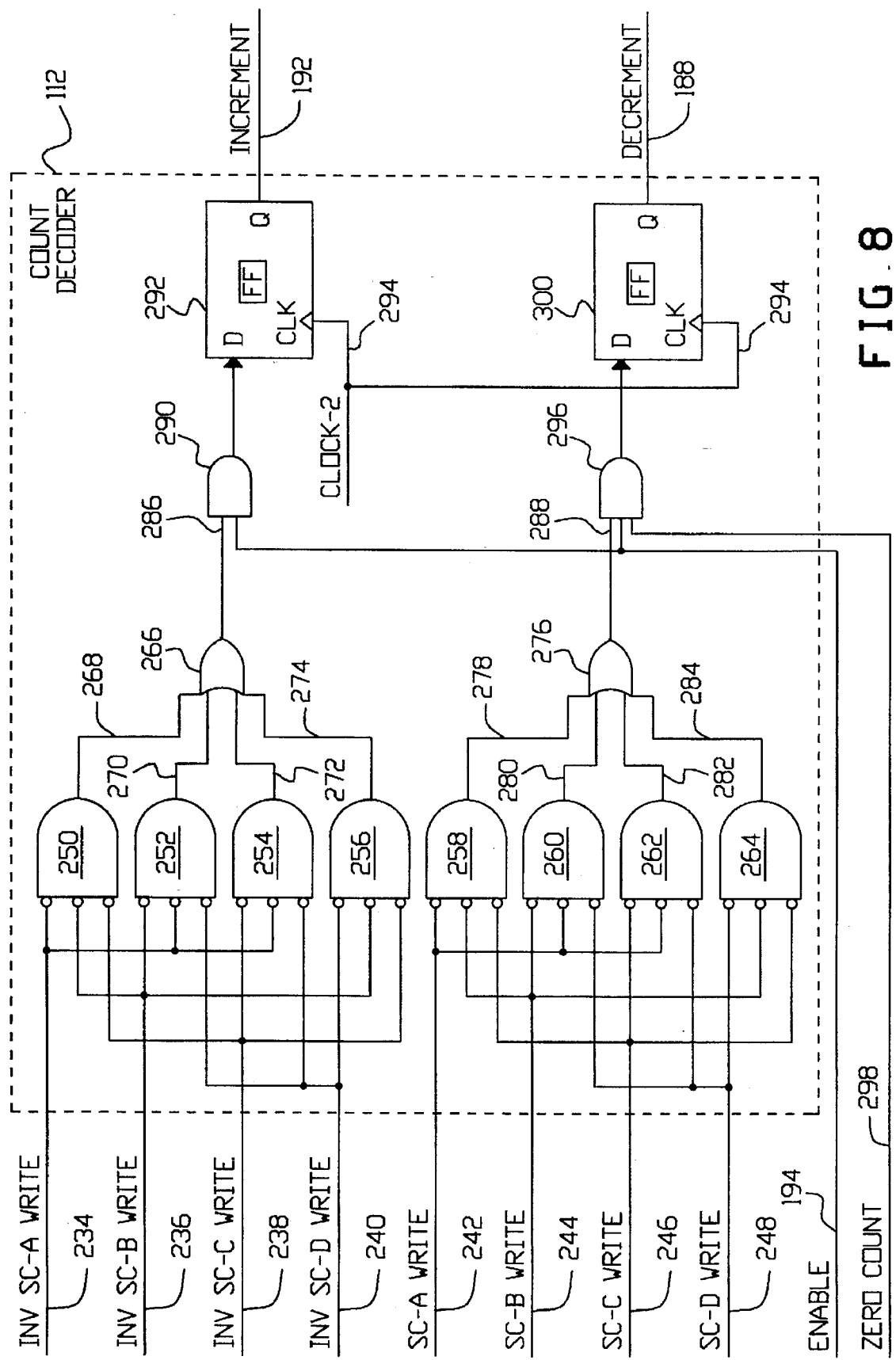
FIG. 8 is a schematic diagram of the Count Decoder circuitry.

FIG. 8 is a schematic diagram of the Count Decoder 112 circuitry. FIG. 3 shows the eight SC WRITE signals on Bus 186 being sent to the Count Decoder 112. FIG. 8 shows the SC WRITE signals individually as they are sent from the Signal Extension Circuit 98, and are labeled INVSC-A WRITE, INVSC-B WRITE, INV SC-C WRITE, INVSC-D WRITE, SC-A WRITE, SC-B WRITE, SC-C WRITE, and SC-D WRITE on Lines 234, 236, 238, 240, 242, 244, 246 and 248 respectively. Eight AND-gates are provided to determine whether zero, one, two, three, or all four of the storage controllers are executing data transfers. These AND-gates are actually three-input NOR-gates, but are represented in FIG. 8 as the De Morgan equivalent (three-input AND-gate with inverted inputs) to clarify the operation of the Count Decoder 112. These AND-gates are labeled AND 250, AND 252, AND 254, AND 256, AND 258, AND 260, AND 262, and AND 264.

The signals on Lines 234, 236, 238 and 240 are inputs to four AND-gates: AND 250, AND 252, AND 254 and AND 256. The signals on Lines 242, 244, 246 and 248 are inputs to the remaining four AND-gates: AND 258, AND 260, AND 262 and AND 264. The SC WRITE signals are active when their associated storage controllers are transferring data, and the SC WRITE signals are activated by the Signal Extension Circuit 98. Therefore, when a storage controller is transferring data, its associated SC-A WRITE, SC-B WRITE, SC-C WRITE or SC-D WRITE signal will be at a high logic level, and its associated INV SC-A WRITE, INV SC-B WRITE, INV SC-C WRITE and INV SC-D WRITE signal will be at a low logic level. The outputs of AND 250, AND 252, AND 254 and AND 256 are coupled to OR 266 via Lines 268, 270, 272 and 274 respectively. The outputs of AND 258, AND 260, AND 262, and AND 264 are coupled to OR 276 via Lines 278, 280, 282 and 284 respectively. OR 266 generates an output on Line 286, and OR 276 generates an output on Line 288. One skilled in the art can determine the outputs of OR 266 and OR 276 for each state of the SC WRITE signals, however FIG. 9 provides the truth table for all possible scenarios.

FIG. 9 is a truth table showing the Count Decoder's 112 response to all possible combinations of active and inactive data transfer interfaces from the storage controllers. As shown in FIG. 9, OR 276 outputs a high logic level whenever only zero or one data transfer interfaces are active (a "1" in the SC-A WRITE, SC-B WRITE, SC-C WRITE or SC-D WRITE column indicates an active data transfer interface). OR 266 outputs a high logic level whenever three or four data transfer interfaces are active (a "0" in the INV SC-A WRITE, INV SC-B WRITE, INV SC-C WRITE, or INV SC-D WRITE column indicates an active data transfer interface). When exactly two interfaces are active, OR 276 and OR 266 output a low logic level.

Returning to FIG. 8, it can be seen that AND 290 will be active when the output of OR 266 on Line 286 is at a high logic level, and the ENABLE signal on Line 194 is at a high logic level. The ENABLE signal was described in FIGS. 6 and 7, and simply enables AND 290 to propagate the signal on Line 286 to the flip-flop labeled FF 292. Therefore, when three or four data transfer interfaces are active, AND 290 will send a high logic level to FF 292, which will be latched at the Q output on the next active edge of the CLOCK-2 signal on Line 294. This generates the INC signal on Line 192, which will be used to increment the count value in the Up/Down Counter It can further be seen that AND 296 will be active when the output of OR 276 on Line 288 is at a high logic level, the ENABLE signal on Line 194 is at a high logic level, and the ZERO COUNT signal on Line 298 is at a high logic level. The ENABLE signal enables AND 296 to propagate the signal on Line 288 to the flip-flop labeled FF 300. The ZERO COUNT signal will be described in more detail in a later portion of this description, and can be assumed to be at a high logic level. Therefore, when zero or one data transfer interfaces are active, AND 296 will send a high logic level to FF 300, which will be latched at the Q output on the next active edge of the CLOCK-2 signal on Line 294. This generates the DEC signal on Line 188, which will be used to decrement the count value in the Up/Down Counter 190.

AND 290 and AND 296 will both be inactive when exactly two data transfer interfaces are active, since the signal on Lines 286 and 288 will both be at low logic levels. In this case, neither the INC signal on Line 192 or the DEC signal on Line 188 will be activated, and the count value in the Up/Down Counter 190 will remain unchanged.

Returning to FIG. 3, the INC signal on Line 192 and the DEC signal on Line 188 are sent to the Up/Down Counter 190. The count value in the Up/Down Counter 190 is incremented, decremented, or left unchanged depending on whether it receives the INC signal, the DEC signal, or no signal respectively. As previously discussed, the INC signal on Line 192 is issued when three or four data transfer interfaces are simultaneously active. This indicates that there is heavy data transfer activity, which if allowed to continue indefinitely, could cause the power capabilities of the system to be exceeded. The count value will be incremented each time an INC signal from Line 192 is received, and will be decremented each time a DEC signal from Line 188 is received. If a predetermined count value is reached by the Up/Down Counter 190, it will indicate that the data transfer interfaces have been heavily active for too long of a period of time, and the rate of data transfer activity must be temporarily slowed down to keep the power supplies from exceeding their power output capabilities.

In the preferred embodiment, approximately one-fourth of one second was determined to be the time that the power supplies could effectively power three or four data transfer interfaces, while staying within their required power output boundaries. The predetermined count value that the Up/Down Counter 190 must reach in order to represent one-fourth of a second depends on the clock speed which is clocking the Up/Down Counter. With the clock speed used in the preferred embodiment, a 19-bit counter was required. An up/down counter is widely known by those skilled in the art, and therefore need not be described in full detail.

The Up/Down Counter 190 sends the two most significant bits to the Selection and Hysteresis Logic 302 via Bus 304. A change in these two bits is recognized by the Selection and Hysteresis Logic 302 which indicates that the one-fourth second time period has expired. The operation of the Selection and Hysteresis Logic will be described in more detail in the discussion of FIGS. 11 and 12.

The Up/Down Counter 190 also sends all 19 count bits to the Zero Detect 306 circuit across Bus 308. The Zero Detect 306 circuit monitors the 19 count bits to determine whether the count value is presently equal to zero. It is necessary to notify the Count Decoder 112 when the count value is zero, so that the Count Decoder 112 does not issue a DEC signal on Line 188 to the Up/Down Counter 190 when the count has already been reduced to zero. If the Zero Detect 306 circuit were not in place, a DEC signal on Line 188 to the Up/Down Counter would cause a count value of zero to "roll over" to a value that appears to be a very high count value. This in turn would mistakenly activate the Selection and Hysteresis Logic 302.

Figure 10:
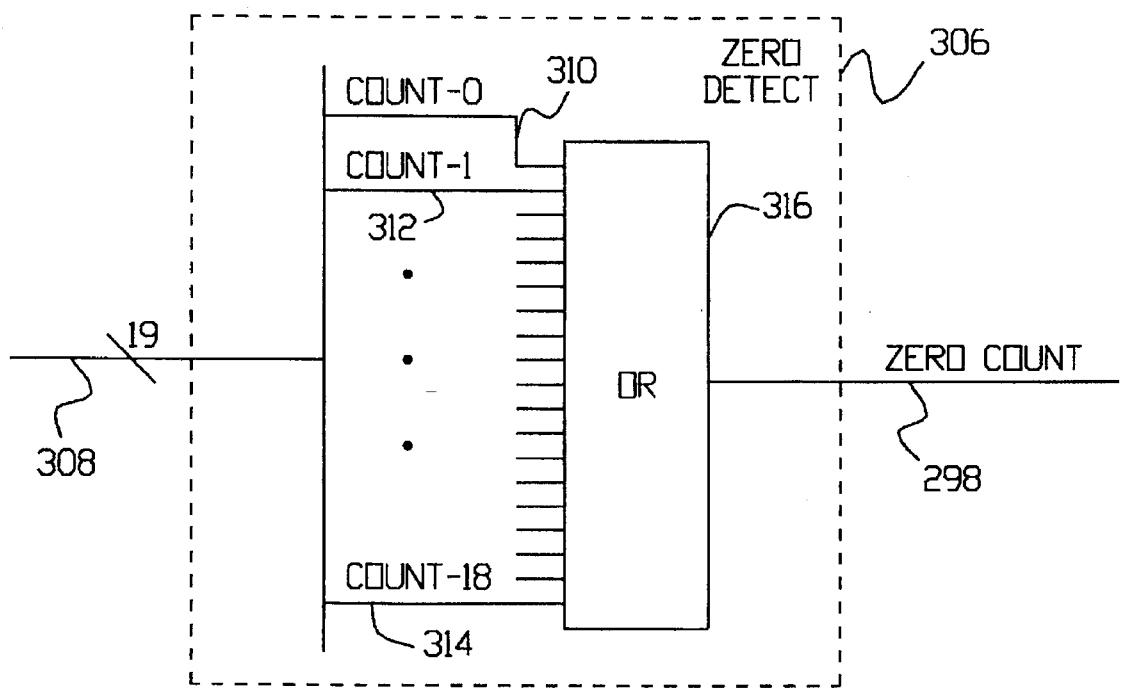
FIG. 10 is a diagram of the Zero Detect circuit used in the preferred embodiment of the invention.

FIG. 10 is a diagram of the Zero Detect 306 circuit used in the preferred embodiment of the invention. The 19-bit count value is sent to the Zero Detect 306 circuit via Bus 308. Each count value (COUNT-0 on Line 310, COUNT-1 on Line 312, through COUNT-18 on Line 314) is input into the 19-bit OR-gate, labeled OR 316. As long as any of the 19 count value bits are at a high logic level, the count value is not equal to zero, and the ZERO COUNT signal on Line 298 will be a logic high. However, when the all 19 bits are at a low logic level, the count value is equal to zero, and the ZERO COUNT on Line 298 will switch to a low logic level. The ZERO COUNT signal is sent to the Count Decoder 112 via Line 298. Briefly referring back to FIG. 8, it can be seen that a logic high ZERO COUNT signal on Line 298 will enable AND 296 to propagate the signal on Line 288, and a logic low ZERO COUNT signal will disable AND 296. By disabling AND 296 when the 19-bit count value is equal to zero, FF 300 of FIG. 8 can not issue a DEC signal on Line 188.

Figure 11:
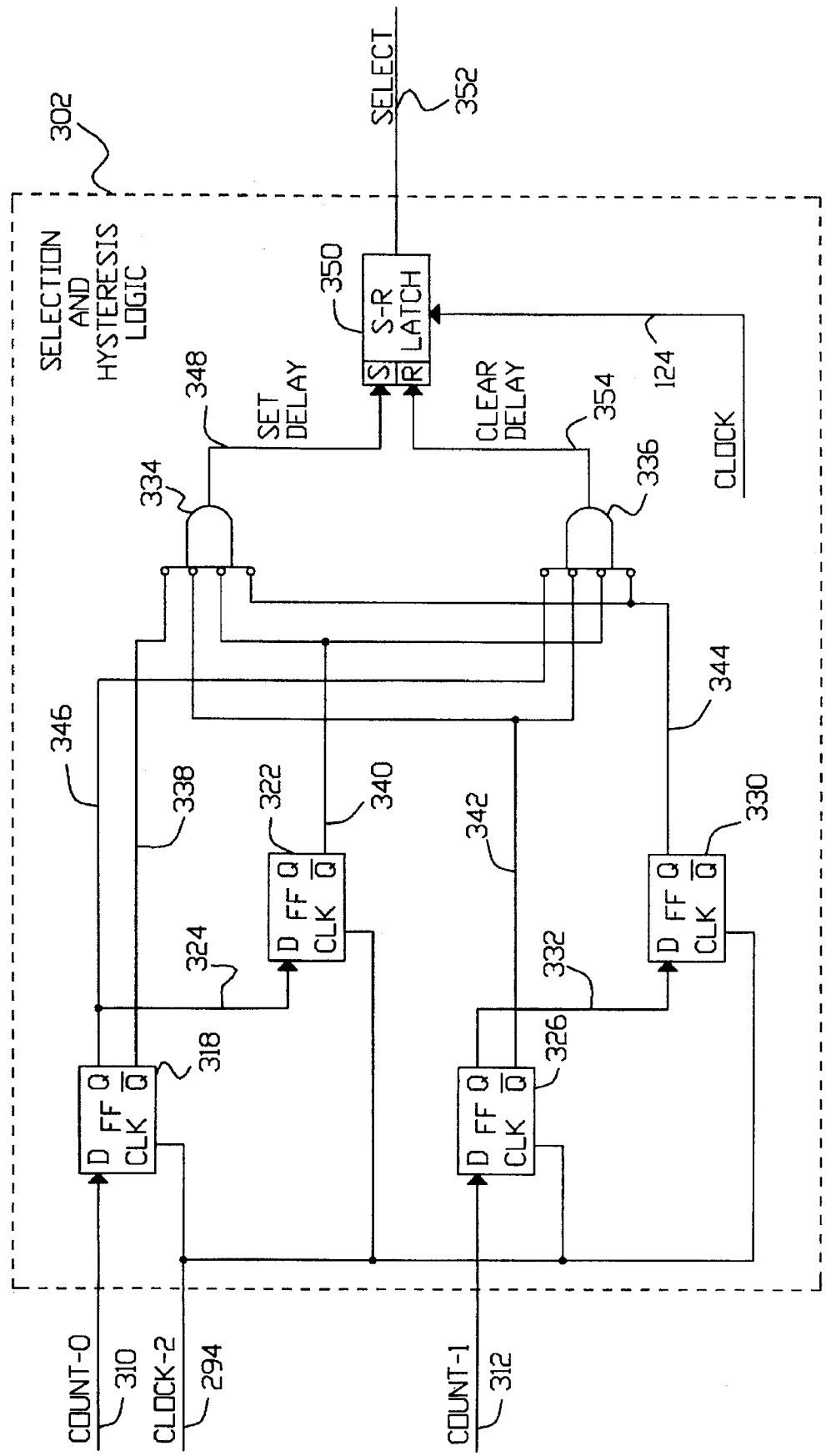
FIG. 11 is a diagram of the Selection and Hysteresis Logic of the preferred embodiment.

FIG. 11 is a diagram of the Selection and Hysteresis Logic 302 of the preferred embodiment. The Selection and Hysteresis Logic 302 receives the COUNT-0 signal on Line 310 and the COUNT-1 signal on Line 312 from the Up/Down Counter 190. Lines 310 and 312 are represented in FIG. 3 by Bus 304. The Selection and Hysteresis Logic 302 consists of four flip-flops (FF) that trigger on a low-to-high triggering edge of the CLOCK-2 signal on Line 294. The COUNT-0 signal on Line 310 is input into FF 318, and the Q output of FF 318 is coupled to the input of FF 322 via Line 324. Similarly, the COUNT-1 signal on Line 312 is input into FF 326, and the Q output of FF 326 is coupled to the input of FF 330 via Line 332. The AND-gates, labeled AND 334 and AND 336, are actually NOR-gates that are represented as their De Morgan equivalents for clarity. AND 334 and AND 336 generate a high logic output when all four of their inputs are at a low logic level. AND 334 is coupled to FF 318, FF 322, FF 326 and FF 330 via Lines 338, 340, 342 and 344 respectively. AND 336 is coupled to FF 318, FF 322, FF 326 and FF 330 via Lines 346, 340, 342 and 344 respectively. When AND 334 recognizes all of its inputs to be at a low logic level, it generates the SET DELAY signal on Line 348, which sets the S-R Latch 350 on the next low-to-high transition of the CLOCK signal on Line 124. This will cause the SELECT signal on Line 352 to be set to a high logic level. When AND 336 recognizes all of its inputs to be at a low logic level, it generates the CLEAR DELAY signal on Line 354, which clears the S-R Latch 350 on the next low-to-high transition of the CLOCK signal on Line 124. This causes the SELECT signal on Line 352 to be cleared to a low logic level. The logic state of the SELECT signal on Line 352 becomes the control line for the multiplexers labeled MUX-A 356, MUX-B 358, MUX-C 360 and MUX-D 362 in FIG. 3. The operation of the multiplexers will be discussed in more detail in a later portion of this description.

The Selection and Hysteresis Logic 302 determines when the two Most Significant Bits (hereinafter MSB) of the 19-bit count value become set. These two bits are represented by the COUNT-0 and COUNT-1 signals on Lines 310 and 312 respectively, where the COUNT-0 signal is the MSB. This occurs when the binary state of the count bits increments from:

```
MSB                          LSB
101  1111  1111  1111  1111    to
110  0000  0000  0000  0000.
```
(MSB = Most Significant Bit; LSB = Least Significant Bit)

(MSB=Most Significant Bit; LSB=Least Significant Bit) When the COUNT-0 and COUNT-1 bits are both set to a binary one, it indicates that three or four data transfers interfaces have been active for approximately one-fourth of one second (assuming a 60 nanosecond clock cycle). When both of these bits are set to a high logic level, the Selection and Hysteresis Logic 302 will set the SET DELAY signal on Line 348, which sets the SELECT signal on Line 352 to a high logic level.

The CLEAR DELAY signal on Line 354 will not be activated until the COUNT-0 bit returns to a low logic level. This will occur when the binary state of the count bits decrements from:

```
MSB                           LSB
100  0000  0000  0000  0000    to
011  1111  1111  1111  1111.
```

Therefore, when the COUNT-0 bit "returns" to a low logic state, the CLEAR DELAY signal on Line 354 will be set. However, the SET DELAY signal was set when the binary state of the count bits was set to 110 0000 0000 0000 0000. This provides hysteresis so that the Selection and Hysteresis Logic 302 must recognize only zero or one active data transfer interfaces for an approximate period of at least 125 milliseconds before the CLEAR DELAY signal on Line 354 will be activated. Therefore, after a SET DELAY signal has occurred, the binary state of the count bits must decrement from:

```
MSB                           LSB
110  0000  0000  0000  0000  (or higher)  to
011  1111  1111  1111  1111,
``` which in the preferred embodiment equates to a minimum of approximately 125 milliseconds. This hysteresis prevents continuous toggling of the SET DELAY and CLEAR DELAY signals on Lines 348 and 354 respectively, when the count value is continuously incrementing and decrementing near the count value which sets the SET DELAY signal.

Figure 12:
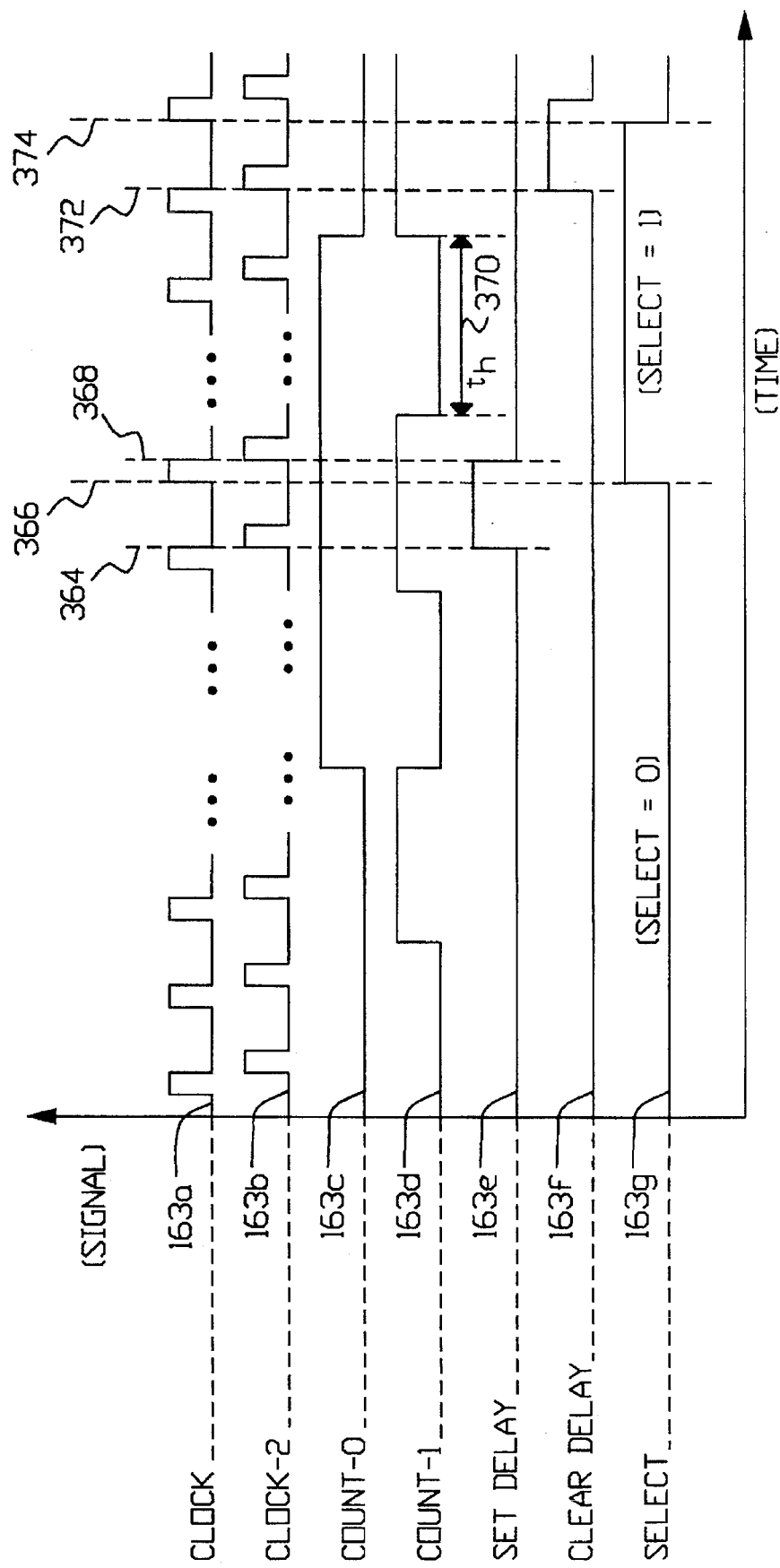
FIG. 12 is a waveform diagram of the operation of the Selection and Hysteresis Logic.

FIG. 12 is a waveform diagram of the operation of the Selection and Hysteresis Logic 302. The operation of the Selection and Hysteresis Logic 302 can be determined one skilled in the art through analysis of FIG. 11, however operation can be most easily seen by viewing the waveform diagram of FIG. 12.

The CLOCK signal 163 a and CLOCK-2 signal 163b represent the signals on Lines 124 and 294 respectively, as shown in FIG. 11. The COUNT-0 and COUNT-1 signals on Lines 310 and 312 are also shown in FIG. 12 as signals 63c and 163d, respectively. The SET DELAY and CLEAR DELAY signals, shown on FIG. 12 as signals 163e and 163f, respectively, remain at an inactive level (low logic level) until "both" the COUNT-0 and COUNT-1 signals switch to a high logic level. Once both the COUNT-0 and COUNT-1 signals are at a high logic level, the next low-to-high transition of the CLOCK-2 signal will cause the SET DELAY signal to be activated. This can be seen at the time represented by Line 364. The SET DELAY signal will then set the S-R Latch 359 of FIG. 11 on the next low-to-high transition of the CLOCK signal, which occurs at the time represented by Line 366. This will in turn set the SELECT signal, shown as signal 163g on FIG. 12 and shown on Line 352 of FIG. 11, to a high logic level. The purpose of the SELECT signal will become apparent in a later portion of this description. At the time represented by Line 368, the SET DELAY signal will return to a low logic level.

The hysteresis designed into the Selection and Hysteresis Logic 302 can be seen as the time labeled $t_h$ shown by Line 370. As can be seen, the SELECT signal remains at a high logic level when the COUNT-1 signal transitions to a low logic level. This period of time is approximately 125 milliseconds in the preferred embodiment. Only after the COUNT-0 signal returns to a low logic level can the SELECT signal drop to a low logic level, which occurs on the next low-to-high transition of the CLOCK-2 signal represented by Line 372. At this time, the CLEAR DELAY signal is activated for one period of the CLOCK-2 signal, and the SELECT signal will be inactivated at the next low-to-high transition of the CLOCK signal, represented by Line 374.

Returning to FIG. 3, the SELECT signal on Line 352 from the Selection and Hysteresis Logic 302 is sent to the multiplexers labeled MUX-A 356 MUX-B 358, MUX-C 360 and MUX-D 362. These multiplexers are 2-1 multiplexers, and the SELECT signal on Line 352 is the control line which selects one of the two multiplexer inputs to be the multiplexer output. The SELECT signal represents whether a predetermined number of data transfer interfaces have been active for a predetermined amount of time. As previously described, when these conditions are met, the invention generates a SELECT signal on Line 352 which will cause the data transfer interface activity to be slowed down for a time approximately equal to the hysteresis time of the Selection and Hysteresis Logic 302. This "slow down" is provided by the delay circuits, labeled Delay A 376, Delay B 378, Delay C 380 and Delay D 382. The signals to be delayed are the ACK-A, ACK-B, ACK-C and ACK-D signals (hereinafter collectively referred to as the "ACK signals") on Lines 384, 386, 388 and 390 respectively. The ACK-A signal was described in FIG. 2, and the ACK-B, ACK-C and ACK-D signals operate in a similar manner. The ACK signals are acknowledge signals, which indicate that the receiving storage controller has received the data, and has sent the data to its associated memory. The ACK signals must be received by their respective requesting storage controller before such requesting storage controllers are allowed to initiate further data transfers. Therefore, by delaying an ACK signal to its requesting storage controller, further data transfers will be delayed by the amount of delay in the respective one of the Delay A 376, Delay B 378, Delay C 380 or Delay D 382 circuits.

As seen in FIG. 3, the ACK-A signal on Line 384 is an input to MUX-A 356. The ACK-A signal is an acknowledge signal to the requesting storage controller, SC-A 22. The ACK-A signal is also sent to Delay A 376 circuit via Line 392. The Delay A 376 circuit will delay the ACK-A signal on Line 392 for a predetermined time, and then send a DELAYED ACK-A signal to MUX-A 356 via Line 394. The SELECT signal will then select the DELAYED ACK-A signal on Line 394 when a predetermined number of data transfer interfaces are active for a predetermined time. Otherwise, the ACK-A signal on Line 384 is chosen, and no delay is injected.

In a similar manner, the ACK-B signal on Line 386 is sent to MUX-B 358 via Line 386, and also to the Delay B 378 circuit via Line 396. The Delay B 378 circuit sends a DELAYED ACK-B signal to MUX-B 358 on Line 398. The ACK-C signal on Line 388 is sent to MUX-C 360 via Line 388, and also to the Delay C 380 circuit via Line 400. The Delay C 380 circuit sends a DELAYED ACK-C signal to MUX-C 360 on Line 402. Finally, the ACK-D signal on Line 390 is sent to MUX-D 362 via Line 390, and also to the Delay D 382 circuit via Line 404. The Delay D 382 circuit sends a DELAYED ACK-D signal to MUX-D 362 on Line 406.

The ACK-A, ACK-B, ACK-C and ACK-D signals on Lines 384, 386, 388 and 390 respectively are sent from the receiving storage controller. For instance, if SC-A 22 sends data to SC-B 30, then SC-B 30 will issue the ACK-A signal when SC-B 30 has received the data and has forwarded the data to the memory associated with SC-B 30. Or, if SC-A 22 sends data to SC-C 38, then SC-C 38 will issue the ACK-A signal when SC-C 38 has received the data and has forwarded the data to the memory associated with SC-C 38.

When the SELECT signal on Line 352 indicates that the acknowledge signals must be delayed, all acknowledge signals are delayed. The SELECT signal is coupled to each of the multiplexers (MUX-A 356, MUX-B 358, MUX-C 360 and MUX-D 362). The multiplexers choose either the ACK signals or the DELAYED ACK signals as a group, and return the appropriate signals to the requesting storage controllers. MUX-A 356 returns either the ACK-A signal on Line 384 or the DELAYED ACK-A signal on Line 394 to SC-A 22 via Line 408. MUX-B 358 returns either the ACK-B signal on Line 386 or the DELAYED ACK-B signal on Line 398 to SC-B 30 via Line 410. MUX-C 360 returns either the ACK-C signal on Line 388 or the DELAYED ACK-C signal on Line 402 to SC-C 38 via Line 412. Finally, MUX-D 362 returns either the ACK-D signal on Line 390 or the DELAYED ACK-D signal on Line 406 to SC-D 46 via Line 414.

Figure 13:
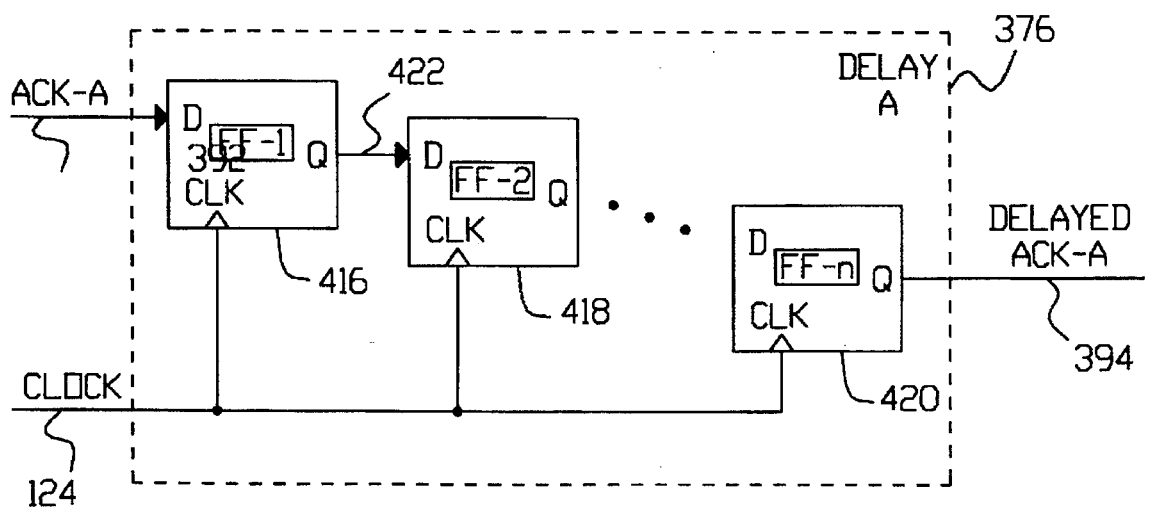
FIG. 13 is a diagram of the Delay A circuit of the preferred embodiment.

FIG. 13 is a diagram of the Delay A 376 circuit of the preferred embodiment. The Delay B 378, Delay C 380 and Delay D 382 circuits are constructed identically to Delay A 376, and therefore only operation of the Delay A 376 circuit will be described. As seen in FIG. 13, a series of flip-flops were used to generate a delay. These flip-flops are labeled FF-1 416, FF-2 418 through FF-n 420, where FF-n 420 represents the final flip-flop in the series. Any number of flip-flops could be used to generate the desired delay. The more flip-flops used, the longer the delay. In the preferred embodiment, four flip-flops were used to generate a delay which is equal to four periods of the CLOCK signal on Line 124.

Operation of the Delay A 376 circuit is evident from analysis of FIG. 13. The ACK-A signal on Line 392 is input to FF-1 416, and on the next active clock pulse of the CLOCK signal, the ACK-A signal becomes present on Line 422, which is the input to FF-2 418. The ACK-A signal is clocked through to successive flip-flops on each consecutive triggering edge of the CLOCK signal on Line 124, until FF-n 420 outputs the DELAYED ACK-A signal on Line 394. The DELAYED ACK-B signal on Line 398, the DELAYED ACK-C signal on Line 402, and the DELAYED ACK-D signal on Line 406 of FIG. 3 are generated in a similar manner.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. For use in a data transmission system having a power source capable of sufficiently providing power up to a predetermined limit, a low power data transmission system comprising:

a plurality of data-transmission means for generating and transmitting a like number of data-write request signals, and for transmitting data signals;

power-limit-evaluation means, coupled to said plurality of data-transmission means, for predicting whether the predetermined limit of the power source has been exceeded, and for generating a power-limit-violation signal when the predetermined limit is exceeded;

a plurality of data-receiving means, for receiving said data and said data-write request signals, and for generating in response thereto data-acknowledge signals; and delay means, coupled to said plurality of data-receiving means and further coupled to said power-limit-evaluation means, for delaying said data-acknowledge signals upon receiving said power-limit-violation signal.

2. The low power data transmission system as in claim 1, wherein said power-limit-evaluation means includes prediction means for predicting whether the predetermined limit of the power source has been exceeded by monitoring the number of active ones of said data-write request signals, and for generating said power-limit-violation signal when a predetermined number of active ones of said data-write request signals are identified.

3. A dynamic power reduction apparatus, for use in a system having a plurality of data transmitters to transmit data to a plurality of data receivers, wherein each data transmitter further transmits a write-indication signal upon initiating a data write request, and wherein each data receiver transmits an acknowledge signal upon receiving data from one of the plurality of data transmitters, and the system further having a power source to provide power to each data transmitter and data receiver, the power reduction apparatus comprising:

summing means, coupled to the plurality of data transmitters, for receiving the write-indication signals, and for generating in response thereto a count signal indicative of the total number of the write-indication signals;

count-decode means, coupled to said summing means, for receiving said count signal, and for generating in response thereto an interface-active signal, an interface-neutral signal, and an interface-inactive signal, depending on the value of said count signal;

counter means, coupled to said count-decode means, for incrementing a count value upon receiving said interface-active signal, and for decrementing said count value upon receiving said interface-inactive signal, and for neither incrementing nor decrementing said count value upon receiving said interface-neutral signal;

count-monitor means, coupled to said counter means, for monitoring said count value, and for generating a first selection signal and a second selection signal in response to said count value; and selection means, coupled to said count-monitor means, for returning the acknowledge signals, upon receipt of said first selection signal, to ones of the plurality of data transmitters which transmitted the write-indication signals, and for returning delayed acknowledge signals, upon receipt of said second selection signal, to ones of the plurality of data transmitters which transmitted the write-indication signals.

4. The dynamic power reduction apparatus as in claim 3, wherein said first selection signal is generated when said count value is greater than a threshold value, and said second selection signal is generated when said count value is less than or equal to said threshold value.

5. The dynamic power reduction apparatus as in claim 4, wherein said threshold value is approximately equal to the time that the power source can safely provide power in excess of its the predetermined power limit.

6. The dynamic power reduction apparatus as in claim 4, wherein said count-monitor means monitors only the two most significant bits of said count value.

7. The dynamic power reduction apparatus as in claim 3, wherein:

said summing means includes means for transmitting a first count signal upon determining said total number of write-indication signals is greater than a predetermined value, transmitting a second count signal upon determining said total number of write-indication signals equals said predetermined value, and transmitting a third count signal upon determining said total number of write-indication signals is less than said predetermined value; and said count-decode means generates said interface-active signal upon receiving said first count signal, and generates said interface-neutral signal upon receiving said second count signal, and generates said interface-inactive signal upon receiving said third count signal.

8. The dynamic power reduction apparatus as in claim 7, further comprising zero-detect means, coupled to said counter means and to said count-decode means, for preventing said count-decode means from generating said interface-inactive signal when said count value is equal to zero.

9. The dynamic power reduction apparatus as in claim 3, further comprising hysteresis means, coupled to said count-monitor means and to said selection means, for causing said selection means to return said delayed acknowledge signals for a predetermined time in response to said count value, when said delayed acknowledge signals have been selected by said selection means.

10. The dynamic power reduction apparatus as in claim 3, further comprising sampling means and a clock signal for enabling said count-decode means to generate said interface-active, said interface-neutral, and said interface-inactive signals only on every N-th pulse of said clock signal.

11. The dynamic power reduction apparatus as in claim 10, wherein said sampling means comprises N latching devices connected in series and clocked by said clock signal, and wherein an enable signal is propagated through said N latching devices on each active pulse of said clock signal, and wherein said enable signal enables said count-decode means when said enable signal has propagated through all of said N latching devices.

12. The dynamic power reduction apparatus as in claim 3, wherein said selection means comprises a plurality of multiplexers, each one of said plurality of multiplexers selecting an associated one of the acknowledge signals or an associated one of said delayed acknowledge signals in response to said first selection signal and said second selection signal respectively.

13. The dynamic power reduction apparatus as in claim 12, further comprising a plurality of delay circuits for generating said delayed acknowledge signals.

14. The dynamic power reduction apparatus as in claim 13, wherein each of said plurality of delay circuits comprises N latching devices connected in series and clocked by a clock signal, and wherein an associated one of the acknowledge signals is propagated through said N latching devices of associated one of said plurality of delay circuits on each active pulse of said clock signal, and wherein an associated one of said delayed acknowledge signals is provided by the last one of said N latching devices in the series.

15. A method of reducing power consumption during periods of high data transfer interface activity, the method comprising the steps of:

transmitting data-write signals when associated data-transmitting circuitry provides data;

periodically ascertaining the total number of said data-write signals;

incrementing a count value when said total number of said data-write signals is greater than a first predetermined value;

decrementing said count value when said total number of said data-write signals is less than said first predetermined value;

returning data-acknowledge signals to said data-transmitting circuitry when data-receiving circuitry receives said data and said count value is less than or equal to a threshold value; and delaying said data-acknowledge signals for a specified duration and returning delayed-data-acknowledge signals to said data-transmitting circuitry when data-receiving circuitry receives said data and said count value is greater than said threshold value.

16. The method as defined by claim 15, further comprising the step of inhibiting said step of decrementing when said count value is equal to zero.

17. The method as defined by claim 15, wherein said step of delaying is performed until said count value has decremented to a predetermined count value less than that of said threshold value.

* * * * *